(12) United States Patent
Park et al.

(10) Patent No.: US 10,528,200 B2
(45) Date of Patent: Jan. 7, 2020

(54) COORDINATE MEASUREMENT DEVICE AND METHOD FOR HOVER SENSING

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Chang-byung Park, Suwon-si (KR); Sung-soo Park, Suwon-si (KR); Ki-duk Kim, Daejeon (KR); Gyu-hyeong Cho, Daejeon (KR); Yeun-hee Huh, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 10 days.

(21) Appl. No.: 15/758,147

(22) PCT Filed: Sep. 5, 2016

(86) PCT No.: PCT/KR2016/009912
§ 371 (c)(1),
(2) Date: Mar. 7, 2018

(87) PCT Pub. No.: WO2017/043821
PCT Pub. Date: Mar. 16, 2017

(65) Prior Publication Data
US 2018/0253167 A1 Sep. 6, 2018

Related U.S. Application Data

(60) Provisional application No. 62/215,519, filed on Sep. 8, 2015, provisional application No. 62/215,083, filed on Sep. 7, 2015.

(30) Foreign Application Priority Data

Jul. 22, 2016 (KR) .................. 10-2016-0093678

(51) Int. Cl.
*G06F 3/044* (2006.01)
*G06F 3/0488* (2013.01)

(52) U.S. Cl.
CPC .......... *G06F 3/044* (2013.01); *G06F 3/04883* (2013.01); *G06F 2203/04101* (2013.01)

(58) Field of Classification Search
CPC ........................... G06F 3/044; G06F 3/04883
(Continued)

(56) References Cited

U.S. PATENT DOCUMENTS 6,535,200 B2 * 3/2003 Philipp ................. G06F 3/0213
178/18.06
6,970,160 B2 * 11/2005 Mulligan ................ G06F 3/044
345/173

(Continued)

FOREIGN PATENT DOCUMENTS

JP   2015-57708 A   3/2015
JP   2015-72686 A   4/2015

(Continued)

OTHER PUBLICATIONS

Communication dated Dec. 13, 2016 issued by the Int. Searching Authority in counterpart Application No. PCT/KR2016/009912 (PCT/ISA/210).

(Continued)

Primary Examiner — Albert K Wong
(74) Attorney, Agent, or Firm — Sughrue Mion, PLLC

(57) ABSTRACT

A coordinate measurement device and method for hover sensing are disclosed. According to the present invention, the coordinate measurement device comprises: a channel electrode unit including a plurality of electrodes, wherein a
(Continued)

capacitance of at least one of the plurality of electrodes variably changes by the approach of a contact object; a driving unit for applying a positive voltage to a first electrode group among the plurality of electrodes and applying a negative voltage to a second electrode group among the plurality of electrodes; a reception unit for receiving reception signals from a plurality of electrodes in the first electrode group and a plurality of electrodes in the second electrode group, respectively; and a processor for determining the position of the contact object on the basis of the received signals. Therefore, the coordinate measurement device can detect an accurate position of the contact object approaching the coordinate measurement device, through a conventional sensing element and circuit process.

14 Claims, 10 Drawing Sheets

(58) Field of Classification Search
USPC .......................................................... 345/174
See application file for complete search history.

(56) References Cited

U.S. PATENT DOCUMENTS

| | | | |
|---|---|---|---|
| 7,868,874 | B2 | 1/2011 | Reynolds |
| 8,766,931 | B2 | 7/2014 | Westhues et al. |
| 9,007,343 | B1 | 4/2015 | Ludden |
| 9,030,441 | B2 | 5/2015 | Yumoto et al. |
| 9,389,740 | B2 | 7/2016 | Jo et al. |
| 9,395,860 | B2 | 7/2016 | Kim et al. |
| 2008/0012835 | A1 | 1/2008 | Rimon et al. |
| 2008/0265914 | A1 | 10/2008 | Matsushima |
| 2010/0321332 | A1 | 12/2010 | Oda et al. |
| 2011/0007021 | A1 | 1/2011 | Bernstein et al. |
| 2011/0037724 | A1 | 2/2011 | Paulsen et al. |
| 2013/0201154 | A1 | 8/2013 | Yun et al. |
| 2014/0267070 | A1 | 9/2014 | Shahparna et al. |
| 2015/0185951 | A1* | 7/2015 | Akai ..................... G06F 3/0418 345/174 |
| 2015/0227232 | A1 | 8/2015 | Yao et al. |

FOREIGN PATENT DOCUMENTS

| | | |
|---|---|---|
| KR | 10-1105447 B1 | 1/2012 |
| KR | 10-2013-0109212 A | 10/2013 |
| KR | 10-2015-0014213 A | 2/2015 |
| WO | 2010/107961 A2 | 9/2010 |

OTHER PUBLICATIONS

Communication dated Dec. 13, 2016 issued by the Int. Searching Authority in counterpart Application No. PCT/KR2016/009912 (PCT/ISA/237).

Yingzhe Hu et al., "3D Gesture-Sensing System for Interactive Displays Based on Extended-Range Capacitive Sensing", ISSCC 2014 / Session 12 / Sensors, MEMS, and Displays / 12.2, 2014 IEEE International Solid-State Circuits Conference, pp. 212-213.

Hyoung-Rae Kim et al., "A Mobile-Display-Driver IC Embedding a Capacitive-Touch-Screen Controller System", ISSCC 2010 / Session 6 / Displays & Biomedical Devices / 6.1, 2010 IEEE International Solid-State Circuits Conference, pp. 114-116.

* cited by examiner

COORDINATE MEASUREMENT DEVICE AND METHOD FOR HOVER SENSING

TECHNICAL FIELD

The present disclosure relates to coordinate measurement device and method for hover sensing, and more particularly, to coordinate measurement device and method which are capable of sensing both touch and hover.

BACKGROUND ART

As smart phones or tablet personal computers (PCs) are widely distributed in recent years, technology for contact position measurement devices embedded therein are rapidly developing. The smart phones or tablet PCs are mainly provided with touch screens, and users may input touch commands through the touch screens.

In particular, when a user's touch command is inputted through a capacitance method, a change in the capacitance formed between a contact object and a touch screen may be sensed, or a change in the capacitance between an X-axis electrode and a Y-axis electrode included in a touch panel of a touch screen may be sensed.

A capacitance value sensed in each method is in inverse proportion to a distance between the contact object and the touch screen. That is, when the distance between the contact object and the touch screen is longer than or equal to a predetermined threshold distance, the capacitance value sensed through the touch screen is very small.

When such a small capacitance value is sensed as described above, a signal to noise ratio (SNR) regarding a noise caused by each electrode or an ambient environment is reduced and thus there is a problem that an exact position of the contact object cannot be sensed.

DETAILED DESCRIPTION OF THE PRESENT DISCLOSURE

Technical Objects

The present disclosure has been developed in order to solve the above-mentioned problems, and simultaneously, to respond to a request for the above-described technology development, and an object of the present disclosure is to sense an exact position of a contact object approaching a coordinate measurement device.

To achieve this object, the present disclosure aims at obtaining a high SNR by preventing a sensing value generated between a contact object and the coordinate measurement device from being lost by a noise caused by an ambient environment.

Furthermore, the present disclosure aims at sensing an exact position of a contact object approaching the coordinate measurement device through a related-art sensing element and circuit process.

Technical Solving Method

According to an exemplary embodiment of the present disclosure to achieve the above-described object, a coordinate measurement device may include: a channel electrode unit including a plurality of electrodes, wherein a capacitance of at least one electrode from among the plurality of electrodes is changed by an approach of a contact object; a driving unit configured to apply a positive voltage to a first electrode group from among the plurality of electrodes, and to apply a negative voltage to a second electrode group from among the plurality of groups; a reception unit configured to receive reception signals from a plurality of electrodes of the first electrode group and a plurality of electrodes of the second electrode group; and a processor configured to determine a position of the contact object based on the received signals.

In addition, the driving unit may apply a positive voltage to a first electrode and a fourth electrode, and apply a negative voltage to a second electrode and a third electrode in the unit of four electrodes.

In addition, the reception unit may include: a first generator configured to add the reception signals received from the electrodes included in the first electrode group, and to output the added signals; a second generator configured to add the reception signals received from the electrodes included in the second electrode group, and to output the added signals; and an amplification unit configured to amplify a difference between the output signal of the first generator and the output signal of the second generator, and to output an amplified signal.

In addition, the first generator may receive reception signals of the first electrode and the third electrode in a first operation section, and may receive reception signals of the third electrode and the fifth electrode in a second operation section, and the second generator may receive reception signals of the second electrode and the fourth electrode in the first operation section, and may receive reception signals from the fourth electrode and the sixth electrode in the second operation section.

In addition, the channel electrode unit may include: a first switching unit configured to selectively provide a predetermined voltage to each of the plurality of electrodes; and a second switching unit configured to provide the reception signals from the plurality of electrodes to the first generator or the second generator.

In addition, the first and second switching units may be lateral double diffused MOSs (LDMOSs).

In addition, the reception unit may further include: a calibration unit configured to store an initial capacitance value of each of the plurality of electrodes, and to apply a calibration signal corresponding to an initial capacitance value of an electrode to which a voltage is applied in the first or second operation section, from among the plurality of electrodes; and a third switching unit configured to selectively provide the calibration signal of the calibration unit to the amplification unit.

In addition, the third switching unit may be a CMOS.

According to another exemplary embodiment of the present disclosure, a coordinate measurement device may include: a channel electrode unit including a plurality of electrodes, wherein a capacitance of at least one electrode from among the plurality of electrodes is changed by an approach of a contact object; a driving unit configured to apply a negative voltage to a portion of the plurality of electrodes, and to apply a positive voltage to the other electrodes; a reception unit configured to receive reception signals from the electrode to which the positive voltage is applied and from the electrode to which the negative voltage is applied; and a processor configured to determine a position of the contact object based on the received signals.

In addition, the driving unit may apply a positive voltage or a negative voltage corresponding to an orthogonal code to each of the plurality of electrodes, based on the orthogonal code which is defined in the unit of a plurality of operation sections and a plurality of electrodes.

In addition, the driving unit may apply a positive voltage to first and third electrodes, and may apply a negative voltage to second and fourth electrodes in a first operation section in the unit of four electrodes, may apply a positive voltage to the first and second electrodes and may apply a negative voltage to the third and fourth electrodes in a second operation section, and may apply a positive voltage to the first and fourth electrode and may apply a negative voltage to the second and third electrodes in a third operation section.

In addition, the channel electrode unit may include: a first switching unit configured to apply a positive voltage or a negative voltage corresponding to the orthogonal code to each of the plurality of electrodes; and a second switching unit configured to operate alternately with the first switching unit, and to selectively provide a reception signal from each of the plurality of electrodes.

In addition, the reception unit may further include an amplification unit configured to receive and amplify reception signals from the first to fourth electrodes.

In addition, the amplification unit may include: an amplifier configured to receive the reception signals from the first to fourth electrodes through a negative terminal, and to receive a predetermined voltage through a positive terminal; a capacitor connected in parallel between the negative terminal and an output terminal; and a third switch configured to selectively connect both ends of the capacitor.

In addition, the third switch may connect both ends of the capacitor in a driving signal application section in which the positive voltage or the negative voltage is applied to the plurality of electrodes, and may be shorted in a reception signal input section in which the reception signals are received.

In addition, the coordinate measurement device may further include a noise reception unit to receive a noise signal of at least one electrode to which a driving voltage is not applied, and the reception unit may output a signal obtained by removing noises from the reception signals of the electrodes to which the positive voltage or the negative voltage is applied, based on the noise signal received from the noise reception unit.

According to still another exemplary embodiment of the present disclosure, a hover sensing method for determining a position of a contact object in a coordinate measurement device includes: applying a positive voltage and a negative voltage to a channel electrode unit including a plurality of electrodes; receiving reception signals from the plurality of electrodes to which the positive voltage and the negative voltage are applied; and determining a position of the contact object based on the received signals. The applying may include applying a positive voltage to a first electrode group from among the plurality of electrodes, and applying a negative voltage to a second electrode group from among the plurality of electrodes.

In addition, the applying may include applying a positive voltage to a first electrode and a fourth electrode, and applying a negative voltage to a second electrode and a third electrode in the unit of four electrodes. The receiving may include amplifying a difference between an output signal which is outputted by adding reception signals received from electrodes included in the first electrode group, and an output signal which is outputted by adding reception signals received from electrodes included in the second electrode group.

In addition, the receiving may include receiving reception signals of the first electrode and the third electrode from among the electrodes included in the first electrode group in a first operation section, receiving reception signals of the third electrode and the fifth electrode in a second operation section, receiving reception signals of the second electrode and the fourth electrode from among the electrodes included in the second electrode group in the first operation section, and receiving reception signals from the fourth electrode and the sixth electrode in the second operation section.

In addition, the method may further include: storing an initial capacitance value of each of the plurality of electrodes, and applying a calibration signal corresponding to an initial capacitance value of an electrode to which a voltage is applied in the first or second operation section, from among the plurality of electrodes, and the determining may include determining the position of the contact object based on a signal outputted based on the received reception signals and the calibration signal.

Advantageous Effect

According to various exemplary embodiments of the present disclosure described above, the coordinate measurement device may sense an exact position of a contact object approaching the coordinate measurement device through a related-art sensing element and circuit process

BEST MODE FOR EMBODYING THE INVENTION

Figure 1:
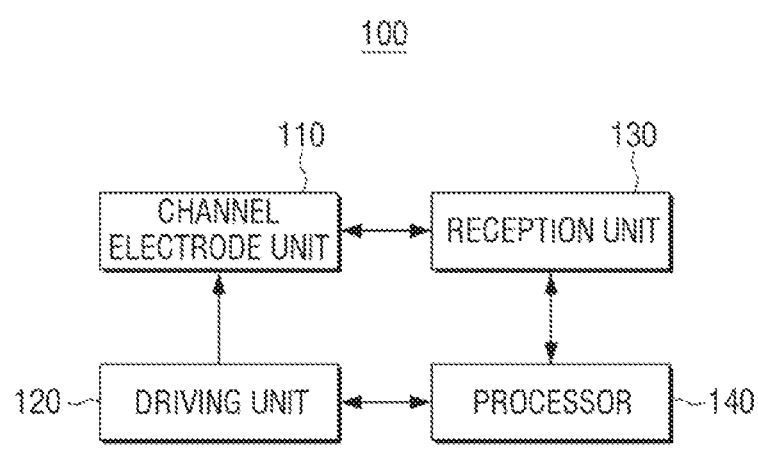
FIG. 1 is a block diagram of a coordinate measurement device according to an exemplary embodiment of the present disclosure.

The terms used in embodiments of the present disclosure are normal terms which are widely used and selected in consideration of the functions in the present disclosure. However, the terms may be changed according to an intention or a legal or technical interpretation of a person skilled in the art and the advent of new technology. In addition, some terms may be arbitrarily selected by the applicant. In this case, meanings of the terms will be described in detail in corresponding detailed descriptions of the present disclosure. Accordingly, the terms used in the present disclosure should be defined based on the entire contents of the present disclosure and common technology knowledge of the related art if there is no specific definition of terms.

In the explanation of the drawings, the same reference numerals or signs are used for components or elements performing substantially the same functions. For a convenience of explanation and understanding, the same reference numerals or signs may be used in other exemplary embodiments. That is, although elements having the same reference numeral are all illustrated in the plurality of drawings, the plurality of drawings do not mean one embodiment.

In addition, terms including ordinal numbers such as "first" and "second" may be used in the detailed description and the claims to distinguish elements from one another. The ordinal numbers may be used to distinguish the same or similar elements from one another, and the meaning of terms should not be interpreted as limiting due to the use of the ordinal numbers. For example, an element combined with an ordinal number should not be limited in use order or arrangement order due to the number. The ordinal numbers may be interchangeably used when necessary.

The singular forms are intended to include the plural forms as well, unless the context clearly indicates otherwise. The terms "include" or "is configured" indicate the presence of features, numbers, steps, operations, elements, and components described in the specification, or a combination thereof, and do not preclude the presence or addition of one or more other features, numbers, steps, operation, elements, or components, or a combination thereof.

In addition, a "module" or "unit" used in exemplary embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors (not shown).

It will be understood that when an element is "connected with" another element, the element may be "directly connected with" another element, and the element may be "electrically connected with" another element with an intervening element therebetween. In addition, when a certain portion "includes" a certain element, it means that the portion may further include other elements rather than excluding other elements unless the context clearly indicates otherwise.

Hereinafter, various exemplary embodiments of the present disclosure will be described in detail with reference to the accompanying drawings.

FIG. 1 is a block diagram of a coordinate measurement device according to an exemplary embodiment of the present disclosure.

As shown in FIG. 1, the coordinate measurement device 100 may include a channel electrode unit 110, a driving unit 120, a reception unit 130, and a processor 140. Herein, the coordinate measurement device 100 may be a touch pad, a touch screen, a notebook computer provided with a touch pad or a touch screen, a mobile phone, a smart phone, a portable multimedia player (PMP), an MP3 player, or the like.

The channel electrode unit 110 may include a plurality of electrodes, and a capacitance of at least one of the plurality of electrodes is changed by the approach of a contact object such as a user's finger. For example, the channel electrode unit 110 may include a plurality of first electrodes arranged in a first direction, and a plurality of second electrodes arranged in a second direction perpendicular to the first direction. The shape and operation of the plurality of electrodes included in the channel electrode unit 110 will be described below with reference to FIG. 2.

The driving unit 120 may apply a positive voltage to a portion of the plurality of electrodes, and may apply a negative voltage to the other electrodes. According to an exemplary embodiment, the driving unit 120 may apply a positive voltage to a portion of the plurality of first electrodes arranged in the first direction, and may apply a negative voltage to the other electrodes. In this case, the plurality of second electrodes arranged in the second direction may be processed by a predetermined voltage or floating. To the contrary, the driving unit 120 may apply a positive voltage to a portion of the plurality of second electrodes arranged in the second direction, and may apply a negative voltage to the other electrodes. In this case, the plurality of first electrodes arranged in the first direction may be processed by a predetermined voltage or floating.

The reception unit 130 may receive a reception signal from each of the plurality of electrodes. Specifically, the reception unit 130 may receive a reception signal from each of the plurality of second electrodes arranged in the first direction or the second direction. That is, the reception unit 130 may receive a reception signal from the plurality of first electrodes in the first direction or the plurality of second electrodes in the second direction, to which a driving signal of a positive voltage or a negative voltage is applied by the approach of a contact object.

In addition, the processor 140 may control the overall operation of each element forming the coordinate measurement device 100. In particular, the processor 140 may determine a position of the contact object based on the signal received from each of the plurality of electrodes. That is, the processor 140 may determine the position of the contact object based on the signal received, through the reception unit 130, from the electrodes in the first direction or the second direction, to which the driving signal of the positive voltage or the negative voltage is applied.

The above-described driving unit 120 may apply a positive voltage to a portion of the plurality of electrodes, and may apply a negative voltage to the other electrodes, according to the following conditions.

According to an exemplary embodiment, the driving unit 120 may apply a positive voltage to a first electrode group from among the plurality of electrodes, and may apply a negative voltage to a second electrode group from among the plurality of electrodes.

According to another exemplary embodiment, the driving unit 120 may apply a positive voltage or a negative voltage corresponding to an orthogonal code to each of the plurality of electrodes, based on the orthogonal code which is defined by a plurality of operation sections and a plurality of electrodes.

Hereinafter, a case in which the driving unit 120 applies a positive voltage to the first electrode group from among the plurality of electrodes, and applies a negative voltage to the second electrode group from among the plurality of electrodes will be described in detail.

When applying the positive voltage and the negative voltage to the first and second electrode groups, the driving unit 120 may apply the positive voltage to a first electrode and a fourth electrode and may apply the negative voltage to a second electrode and a third electrode in the unit of four electrodes. However, the present disclosure is not limited thereto, and the present disclosure may set electrode groups in the unit of four or more electrodes, for example, 8 electrodes, 12 electrodes, or the like. The driving unit 120 may apply a positive voltage to a portion of the plurality of electrodes set to a group, and may apply a negative voltage to the other electrodes.

In this case, the positive voltage and the negative voltage applied to the first and second electrode groups may be high voltages. However, the present disclosure is not limited thereto, and a positive voltage and a negative voltage of low voltages may be applied to electrodes included in the first and second electrode groups. The reception unit 130 may include a first generator 131, a second generator 132, and an amplification unit 133. The first generator 131 may add reception signals received from electrodes included in the first electrode group from among the plurality of electrodes, and may output the added signals. In addition, the second generator 132 may add reception signals received from electrodes included in the second electrode group from among the plurality of electrodes, and may output the added signals. The amplification unit 133 may amplify a difference between the output signal outputted from the first generator 131 and the output signal outputted from the second generator 132, and may output the amplified signal.

That is, the first generator 131 may offset an offset capacitance value of the first electrode to which the positive voltage is applied, and an offset capacitance value of the third electrode to which the negative voltage is applied, and may output a reception signal related to a current corresponding to a differential component remaining after the offset. The second generator 132 may offset an offset capacitance value of the fourth electrode to which the positive voltage is applied, and an offset capacitance value of the second electrode to which the negative voltage is applied, and may output a reception signal related to a current corresponding to a differential component remaining after the offset.

Accordingly, the amplification unit 133 may amplify only the reception signal related to the capacitance generated between the plurality of electrodes included in the first and second electrode groups and the contact object.

The channel electrode unit 110 may include first and second switching units 111, 113, and the positive voltage or negative voltage may be applied to the plurality of electrodes by the first and second switching units 111, 113, and signals of the plurality of electrodes to which the positive voltage or the negative voltage is applied may be transmitted to the reception unit 130. Herein, the first and second switching units 111, 113, which are majority carrier devices, may be implemented by using horizontal power devices such as a lateral double diffused MOS (LDMOS) having a rapid switching response and a high impedance.

Specifically, the first switching unit 111 selectively provides a predetermined voltage to each of the plurality of electrodes. According to an exemplary embodiment, the first switching unit 111 may switch to apply a predetermined positive (+) high voltage to the plurality of electrodes included in the first electrode group, and to apply a predetermined negative (−) high voltage to the plurality of electrodes included in the second electrode group. According to the switching on/off operation of the first switching unit 111 described above, the predetermined positive (+) high voltage or negative (−) high voltage may be applied to the plurality of electrodes included in the first electrode group or the second electrode group. However, the present disclosure is not limited thereto, and a positive (+) high voltage and a negative (−) high voltage of different sizes may be applied to the plurality of electrodes included in the first electrode group and the second electrode group.

In addition, the second switching unit 113 may provide reception signals from the plurality of electrodes included in the first and second electrode groups to the first generator 131 or the second generator 132. According to the switching operation of the second switching unit 113 described above, the first generator 131 may receive reception signals of the electrodes included in the first electrode group from among the plurality of electrodes included in the first and second electrode groups, and the second generator 132 may receive reception signals of electrodes included in the second electrode group from among the plurality of electrodes included in the first and second electrode groups.

The reception signals received at the reception unit 130 may include signal components related to movement noises occurring in the plurality of electrodes included in the first and second electrode groups, in addition to a signal component related to offset capacitance values of the plurality of electrodes included in the first and second electrode groups, and a capacitance value generated by hovering.

Therefore, the following operations may be performed to remove the movement noises occurring in the plurality of electrodes included in the first and second electrodes.

Specifically, in an ODD section, which is a first operation section, the first generator 131 may receive reception signals of the first and third electrodes, and the second generator 132 may receive reception signals of the second and fourth electrodes. In addition, in an Even section, which is a second operation section, the first generator 131 may receive reception signals of the third and fifth electrodes, and the second generator 132 may receive reception signals of the fourth and sixth electrodes.

Accordingly, the first generator 131 may generate $I_1$, $-I_1$ based on the reception signals received from the first and third electrodes in the first operation section, and the second generator 132 may generate $I_2$, $-I_2$ based on the reception signals received from the second and fourth electrodes. A signal in which $I_1$ and $-I_2$ generated in the first operation section are added, and a signal in which $-I_1$ and $I_2$ are added may be inputted to the amplification unit 133, and the signal amplified through the amplification unit 133 may be outputted to $V_{OP}$ and $V_{ON}$ nodes. The movement noises included in $I_1$ and $I_2$ may be removed by adding $I_1$ and $-I_2$ and adding $-I_1$ and $I_2$.

Also, the first generator 131 may generate $I_1$, $-I_1$ based on the reception signals received from the third and fifth electrodes in the second operation section, and the second generator 132 may generate $I_2$, $-I_2$ based on the reception signals received from the fourth and sixth electrodes. A signal in which $I_1$ and $-I_2$ generated in the second operation section are added, and a signal in which $-I_1$ and $I_2$ are added may be inputted to the amplification unit 133, and the signal amplified through the amplification unit 133 may be outputted to $V_{OP}$ and $V_{ON}$ nodes. The movement noises included in $I_1$ and $I_2$ may be removed by adding $I_1$ and $-I_2$ and adding $-I_1$ and $I_2$.

According to an additional aspect of the present disclosure, the reception unit 130 may further include a calibration unit 134 and a third switching unit 135.

The calibration unit 134 may store an initial capacitance value of each of the plurality of electrodes, and may apply a calibration signal corresponding to the initial capacitance value of the electrode to which the voltage is applied in the first or second operation section from among the plurality of electrodes. In addition, the third switching unit 135 may selectively provide the calibration signal of the calibration unit 134 to the amplification unit 133. Herein, the third switching unit 135 may be implemented by using a complementary metal oxide semiconductor (CMOS).

Specifically, the capacitance values of the plurality of electrodes may cause an error due to a process deviation and an environmental deviation according to a fabrication process of a panel.

Accordingly, the calibration unit 134 stores the initial capacitance values stored for the plurality of electrodes before the positive voltage or negative voltage is applied to the plurality of electrodes through the driving unit 120. Thereafter, the calibration unit 134 applies the calibration signal corresponding to the initial capacitance value of the electrode to which the voltage is applied in the first or second operation section from among the plurality of electrodes.

Specifically, in the first operation section, the first generator 131 may output the reception signals of the first and third electrodes, and the second generator 132 may output the reception signals of the second and fourth electrodes. In response to the reception signals being outputted, the calibration unit 134 may apply the calibration signal corresponding to the initial capacitance values of the first to fourth electrodes according to the switching operation of the third switching unit 135. Accordingly, the amplification unit 133 may receive an output signal from which an error value related to the initial capacitance values of the first to fourth electrodes is removed.

Also, in the second operation section, the first generator 131 may output the reception signals of the third and fifth electrodes, and the second generator 132 may output the reception signals of the fourth and sixth electrodes. In response to the reception signals being outputted, the calibration unit 134 may apply the calibration signal corresponding to the initial capacitance values of the third to sixth electrodes according to the switching operation of the third switching unit 135. Accordingly, the amplification unit 133 may receive an output signal from which an error value related to the initial capacitance values of the third to sixth electrodes is removed.

Therefore, the output signals outputted to the amplification unit 133 through the first and second generators 131, 132 in the first and second operation sections may be signals from which the movement noise occurring in each electrode and the error value related to the initial capacitance value of each electrode are removed, and the amplification unit 133 may amplify a difference between the output signals and may output the amplified signal. Accordingly, the processor 140 may determine the position of the contact object by which hovering is sensed, based on the signal outputted through the amplification unit 133. Hereinafter, a case in which the driving unit 120 applies a positive voltage or a negative voltage corresponding to an orthogonal code to each of the plurality of electrodes, based on the orthogonal code which is defined in the unit of a plurality of operation sections and a plurality of electrodes.

As described above, the driving unit 120 may apply a positive voltage or a negative voltage corresponding to an orthogonal code to each of the plurality of electrodes, based on the orthogonal code which is defined in the unit of a plurality of operation sections and a plurality of electrodes.

According to an exemplary embodiment, the driving unit 120 may apply a positive voltage to the first and third electrodes, and may apply a negative voltage to the second and fourth electrodes in the first operation section in the unit of four electrodes. In addition, in the second operation section, the driving unit 120 may apply a positive voltage to the first and second electrodes, and may apply a negative voltage to the third and fourth electrodes. In addition, in the third operation section, the driving unit 120 may apply a positive voltage to the first and fourth electrodes, and may apply a negative voltage to the second and third electrodes.

In this case, the first switching unit 111 of the channel electrode 110 may apply a positive voltage or a negative voltage corresponding to the orthogonal code to each of the plurality of electrodes, and the second switching unit 113 may operate alternately with the first switching unit 111 to selectively provide the reception signal from each of the plurality of electrodes to the reception unit 130.

Accordingly, the amplification unit 133 may amplify the reception signals received from the first to fourth electrodes altogether, and the processor 140 may determine the position of the contact object based on the signal amplified through the amplification unit 133.

The above-described amplification unit 133 may include an amplifier 133-1, a capacitor 133-2, and a third switch 133-3.

The amplifier 133-1 may be an OP amplifier, and may receive the reception signals of the first to fourth electrodes through a negative terminal, and may receive a predetermined voltage through a positive terminal, and the capacitor 133-2 may be connected in parallel between the negative terminal and the output terminal of the amplifier 133-1. In addition, the third switch 133-3 may selectively connect both ends of the capacitor 133-2. Specifically, the third switch 133-3 may connect both ends of the capacitor 133-2 in a driving signal application section in which the positive voltage or the negative voltage is applied to the plurality of electrodes, and may be shorted in a reception input section in which the reception signals of the first to fourth electrodes are received.

According to an additional aspect of the present disclosure, the coordinate measurement device 100 may further include a noise reception unit 150 to receive a noise signal of at least one electrode to which a driving voltage is not applied.

Since the noise reception unit 150 may have the same configuration as that of the above-described amplification unit 133, the noise reception unit 150 will not be described in detail.

In response to the reception signals of the first to fourth electrodes being amplified through the amplification unit 133, and outputted, and the noise signals outputted from the noise reception unit 150 being received, the reception unit 130 may output a signal obtained by removing the noises from the reception signals of the electrodes to which the positive voltage or the negative voltage is applied, based on the noise signals received from the noise reception unit 150.

Up to now, the respective elements of the coordinate measurement device 100 for hover sensing according to the present disclosure have been described in detail. Hereinafter, an operation of sensing hovering in the coordinate measurement device 100 according to the present disclosure will be described in detail.

Figure 2:
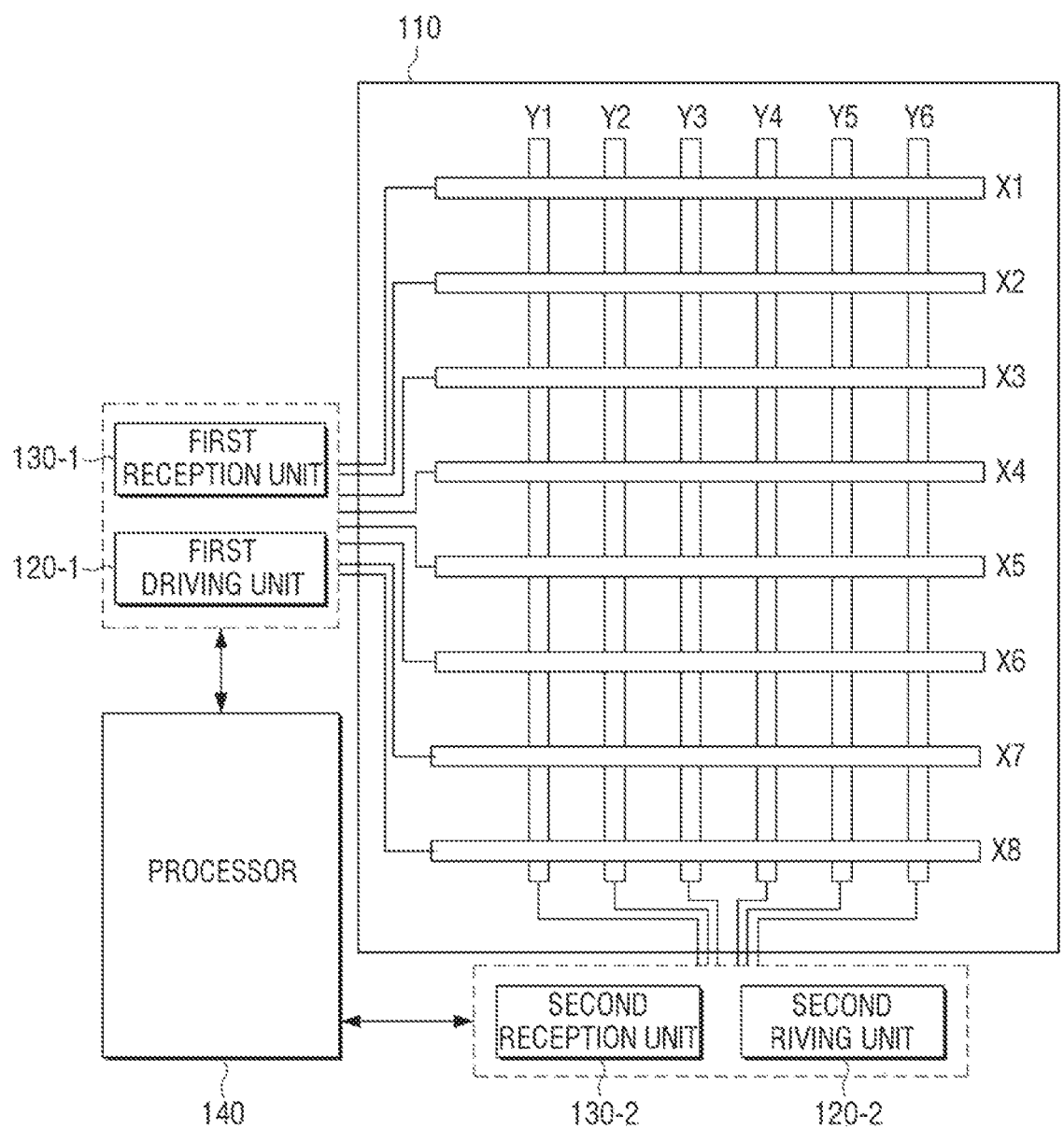
FIG. 2 is a circuit diagram of the coordinate measurement device according to an exemplary embodiment of the present disclosure.

FIG. 2 is a circuit diagram of the coordinate measurement device according to an exemplary embodiment of the present disclosure.

As shown in FIG. 2, the coordinate measurement device 100 may include the channel electrode unit 110, the driving unit 120, the reception unit 130, and the processor 140.

The channel electrode unit 110 may include a plurality of electrodes X1-X8 arranged in a first direction (horizontal direction), and a plurality of electrodes Y1-Y6 arranged in a second direction (vertical direction).

The plurality of electrodes X1-X8 arranged in the first direction, and the plurality of electrodes Y1-Y6 arranged in the second direction may be transparent electrodes, and may be formed of indium tin oxide (ITO). According to an exemplary embodiment, when hovering sensing is performed through the plurality of electrodes X1-X8 arranged in the first direction, the plurality of electrodes Y1-Y6 arranged in the second direction may be processed by a predetermined voltage or floating.

On the other hand, when hovering sensing is performed through the plurality of electrodes Y1-Y6 arranged in the second direction, the plurality of electrodes X1-X8 arranged in the first direction may be processed by a predetermined voltage or floating.

Specifically, when hovering sensing is performed through the plurality of electrodes X1-X8 arranged in the first direction, a predetermined driving signal (Tx signal) may be applied to the plurality of electrodes X1-X8 arranged in the first direction. When a contact object approaches the coordinate measurement device 100 with the driving signal being applied to the plurality of electrodes X1-X8, at least one of the plurality of electrodes X1-X8 may receive an RX signal caused by the contact object approaching the coordinate measurement device 100.

On the other hand, when hovering sensing is performed through the plurality of electrodes Y1-Y6 arranged in the second direction, a predetermined driving signal (Tx signal) may be applied to the plurality of electrodes Y1-Y6 arranged in the second direction. When a contact object approaches the coordinate measurement device 100 with the driving signal being applied to the plurality of electrodes Y1-Y6, at least one of the plurality of electrodes Y1-Y6 may receive an RX signal caused by the contact object approaching the coordinate measurement device 100.

Although the plurality of electrodes X1-X8 arranged in the first direction are eight electrodes and the plurality of electrodes Y1-Y6 arranged in the second direction are six electrodes in the illustrated example, a different number of electrodes may be implemented in practice. In addition, although the shape of the electrode in the electrode group is illustrated as a simple rectangular shape in the illustrated example, the shape of each electrode may be implemented in a more complicated shape in practice.

The driving unit 120, which applies a positive voltage to a portion of the plurality of electrodes and applies a negative voltage to the other electrodes, may include first and second driving units 120-1, 120-2, and the reception unit 130, which receives the reception signals from the plurality of electrodes, respectively, may include first and second reception units 130-1, 130-2. As described above, when hovering sensing is performed through the plurality of electrodes X1-X8 arranged in the first direction, the first driving unit 120-1 may apply a driving signal to the plurality of electrodes X1-X8 arranged in the first direction. Specifically, the first driving unit 120-1 may apply a driving signal of a positive voltage to a portion of the plurality of electrodes X1-X8 arranged in the first direction, and may apply a driving signal of a negative voltage to the other electrodes.

Accordingly, the first reception unit 130-1 may receive response signals from the plurality of electrodes X1-X8 arranged in the first direction, respectively.

On the other hand, when hovering sensing is performed through the plurality of electrodes Y1-Y6 arranged in the second direction, the second driving unit 120-2 may apply a driving signal to the plurality of electrodes Y1-Y6 arranged in the second direction. Specifically, the second driving unit 120-2 may apply a driving signal of a positive voltage to a portion of the plurality of electrodes Y1-Y6 arranged in the second direction, and may apply a driving signal of a negative voltage to the other electrodes.

Accordingly, the second reception unit 130-2 may receive response signals from the plurality of electrodes Y1-Y6 arranged in the second direction, respectively.

Hereinafter, operations of, when hovering sensing is performed through the plurality of electrodes X1-X8 arranged in the first direction, applying a driving signal to the plurality of electrodes X1-X8 arranged in the first direction, and receiving response signals from the plurality of electrodes X1-X8, will be described in detail.

According to an exemplary embodiment, the first driving unit 120-1 may apply a driving signal of a positive voltage to the first electrode X1, the fourth electrode X4, the fifth electrode X5, and the eighth electrode X8 included in the first electrode group from among the plurality of electrodes X1-X8 arranged in the first direction, and may apply a driving signal of a negative voltage to the second electrode X2, the third electrode X3, the sixth electrode X6, and the seventh electrode X7 included in the second electrode group. The positive voltage and the negative voltage applied to the plurality of electrodes X1-X8 included in the first and second electrode groups may be driving signals of high voltages. In addition, the positive voltage and the negative voltage applied to the plurality of electrodes X1-X8 included in the first and second electrode groups may be driving signals of the same size or driving signals of different sizes.

In response to the driving signals of the positive voltage and the negative voltage being applied to the plurality of electrodes X1-X8 included in the first and second electrode groups as described above, the first reception unit 130-1 may receive reception signals from the plurality of electrodes X1-X8 included in the first and second electrode groups, respectively.

Accordingly, the processor 140 may determine whether the contact object is positioned between the electrodes X1-X8 of the first direction, based on the output signals of the electrodes X1-X8 of the first direction.

According to another exemplary embodiment, the first driving unit 120-1 may apply driving signals of a positive voltage or a negative voltage to the plurality of electrodes X1-X8 arranged in the first direction, based on an orthogonal code which is defined in the unit of a plurality of operation sections and a plurality of electrodes. That is, the first driving unit 120-1 may apply driving signals of a positive voltage or a negative voltage to the plurality of electrodes X1-X8 arranged in the first direction, based on an orthogonal code which is pre-defined according to each operation section in the unit of four electrodes.

For example, with respect to a four-electrode unit of the plurality of electrodes X1-X8 arranged in the first direction, the first driving unit 120-1 may apply a driving signal of a positive voltage to the first and third electrodes, and may apply a driving signal of a negative voltage to the second and fourth electrodes in the first operation section. In addition, in the second operation section, the first driving unit 120-1 may apply a driving signal of a positive voltage to the first and second electrodes, and may apply a driving signal of a negative voltage to the third and fourth electrodes. In addition, in the third operation section, the first driving unit 120-1 may apply a driving signal of a positive voltage to the first and fourth electrodes, and may apply a driving signal of a negative voltage to the second and third electrodes.

In this case, the first reception unit 130-1 may add the reception signals of the positive voltage and the negative voltage of the first to fourth electrodes X1-X4 arranged in the first direction according to each operation section (first to third operation sections), and may amplify the added signals and output the same. Accordingly, the processor 140 may determine the position of the contact object based on the amplified signal.

On the other hand, when hovering sensing is performed through the plurality of electrodes Y1-Y6 arranged in the second direction, the second driving unit 120-2 and the second reception unit 130-2 may perform the same operations as the operations of the above-described first driving unit 120-1 and first reception unit 130-1. Accordingly, the second driving unit 120-2 and the second reception unit 130-2 will not be described in detail in the present disclosure.

The channel electrode unit 110 according to the present disclosure may be formed of a plurality of layered panels in which a plurality of electrodes are arranged in different directions as shown in FIG. 2. However, the present disclosure is not limited thereto, and the channel electrode unit 110 may be formed of a single layer panel in which a plurality of electrodes are arranged on a node basis.

Figure 3:
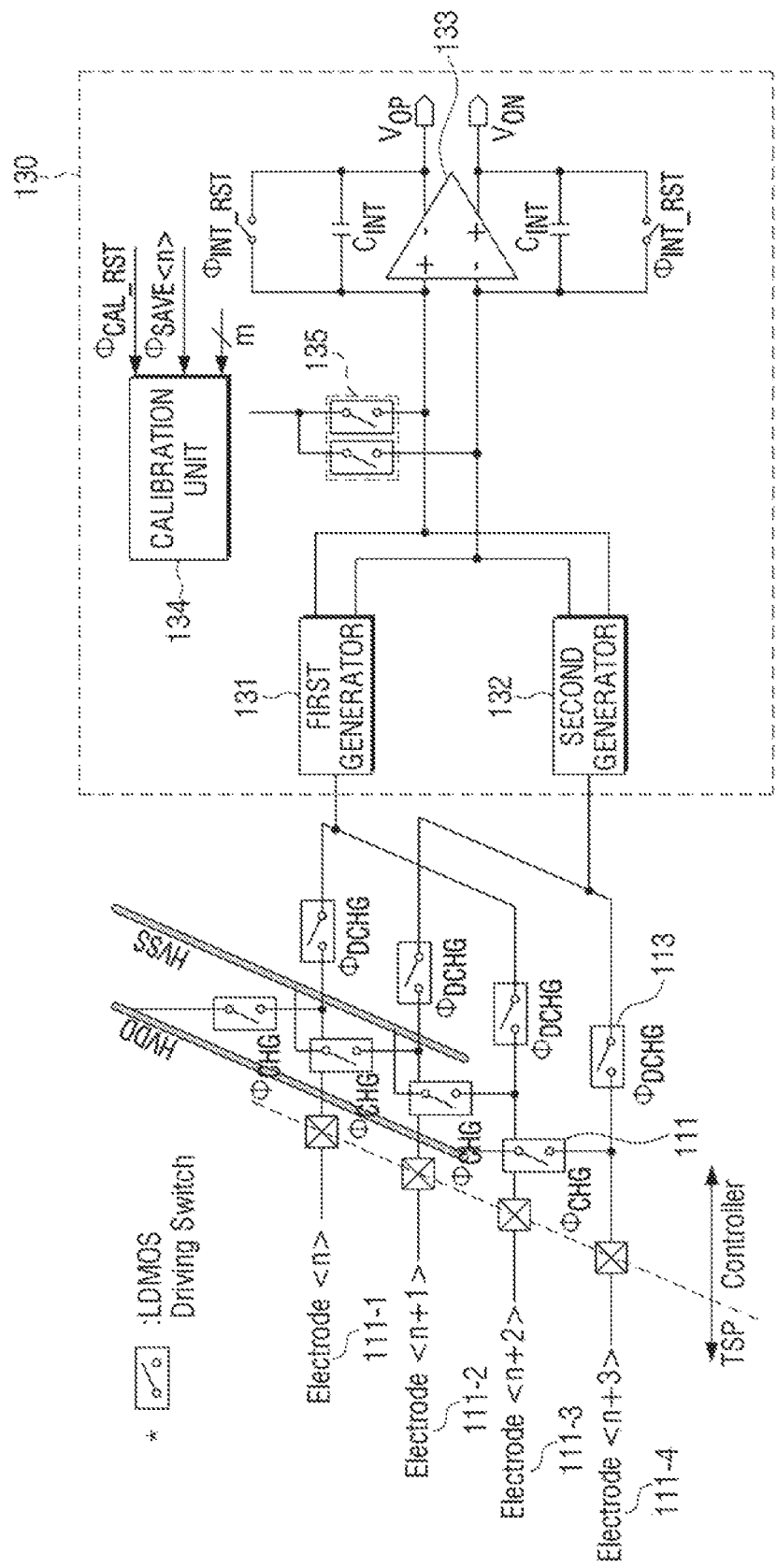
FIG. 3 is a circuit diagram for sensing hovering by applying a driving signal of a high voltage to a channel electrode unit in the coordinate measurement device according to an exemplary embodiment of the present disclosure.

FIG. 3 is a circuit diagram for sensing hovering by applying a driving signal of a high voltage to the channel electrode unit in the coordinate measurement device according to an exemplary embodiment of the present disclosure.

As shown in FIG. 3, the coordinate measurement device 100 may include the channel electrode unit 110 and the reception unit 130. The channel electrode unit 110 may include a plurality of electrodes, which may be divided in the unit of four electrodes. When the electrodes are divided in the unit of four electrodes, the first switching unit 111 of the first and fourth electrodes from among the first to fourth electrodes may be switched on at a time when a driving signal of a positive voltage is applied from the driving unit 120. Accordingly, the driving signal of the positive voltage may be applied to the first and fourth electrodes. On the other hand, the first switching unit 111 of the second and third electrodes from among the first to fourth electrodes may be switched on at a time when a driving signal of a negative voltage is applied from the driving unit 120. Accordingly, the driving signal of the negative voltage may be applied to the second and third electrodes.

After that, in response to the second switching unit 113 of the first and third electrodes from among the first to fourth electrodes being switched on, the first generator 131 may add the reception signals received from the first and third electrodes, and may output the added signals. In addition, in response to the second switching unit 113 of the second and fourth electrodes from among the first to fourth electrodes being switched on, the second generator 132 may add the reception signals received from the second and fourth electrodes, and may output the added signals. Accordingly, the amplification unit 133 may amplify a difference between the output signals outputted from the first and second generators 131, 132.

The reception signals received at the first and second generators 131, 132 may include signal components related to movement noises occurring in the plurality of electrodes. Accordingly, in order to remove the signal components related to the movement noises included in the reception signals received at the first and second generators 131, 132, the coordinate measurement device 100 may perform the following operations.

Specifically, in the ODD section, which is the first operation section, the first generator 131 may receive the reception signals of the first and third electrodes, and the second generator 132 may receive the reception signals of the second and fourth electrodes. In addition, in the Even section, which is the second operation section, the first generator 131 may receive the reception signals of the third and fifth electrodes, and the second generator 132 may receive the reception signals of the fourth and sixth electrodes.

Accordingly, the first generator 131 may generate $I_1$, $-I_1$ based on the reception signals received from the first and third electrodes in the first operation section, and the second generator 132 may generate $I_2$, $-I_2$ based on the reception signals received from the second and fourth electrodes. In such a first operation section, a signal in which $I_1$ and $-I_2$ are added, and a signal in which $-I_1$ and $I_2$ are added, may be inputted to the amplification unit 133, and a signal amplified at the amplification unit 133 may be outputted to $V_{OP}$ and $V_{ON}$ nodes. The movement noises included in $I_1$ and $I_2$ may be removed by adding $I_1$ and $-I_2$ and adding $-I_1$ and $I_2$.

On the other hand, the first generator 131 may generate $I_1$, $-I_1$ based on the reception signals received from the third and fifth electrodes in the second operation section, and the second generator 132 may generate $I_2$, $-I_2$ based on the reception signals received from the fourth and sixth electrodes. In such a second operation section, a signal in which $I_1$ and $-I_2$ are added, and a signal in which $-I_1$ and $I_2$ are added, may be inputted to the amplification unit 133, and a signal amplified at the amplification unit 133 may be outputted to $V_{OP}$ and $V_{ON}$ nodes. The movement noises included in $I_1$ and $I_2$ may be removed by adding $I_1$ and $-I_2$ and adding $-I_1$ and $I_2$.

The capacitance values of the plurality of electrodes may cause an error due to a fabrication deviation and an environmental deviation according to a fabrication process or a panel. Accordingly, in order to remove the error value caused by the initial capacitance value of each of the plurality of electrodes, the coordinate measurement device 100 may perform the following operations.

As shown in the drawing, the reception unit 130 may remove the error value generated by the initial capacitance value of each of the plurality of electrodes, based on a calibration signal applied through the calibration unit 134. Specifically, the calibration unit 134 may store the initial capacitance value of each of the plurality of electrodes, and may apply a calibration signal corresponding to an initial capacitance value of an electrode to which a voltage is applied in the first or second operation section, from among the plurality of electrodes.

Specifically, in the first operation section, the first generator 131 may output the reception signals of the first and third electrodes, and the second generator 132 may output the reception signals of the second and fourth electrodes. In response to such reception signals being outputted, the calibration unit 134 may apply a calibration signal corresponding to the initial capacitance values of the first to fourth electrodes. Accordingly, the amplification unit 133 may receive an output signal from which an error value related to the initial capacitance values of the first to fourth electrodes is removed.

On the other hand, in the second operation section, the first generator 131 may output the reception signals of the third and fifth electrodes, and the second generator 132 may output the reception signals of the fourth and sixth electrodes. In response to such reception signals being applied, the calibration unit 134 may apply a calibration signal corresponding to the initial capacitance values of the third to sixth electrodes. Accordingly, the amplification unit 133 may receive an output signal from which an error value related to the initial capacitance values of the third to sixth electrodes is removed.

Figure 4:
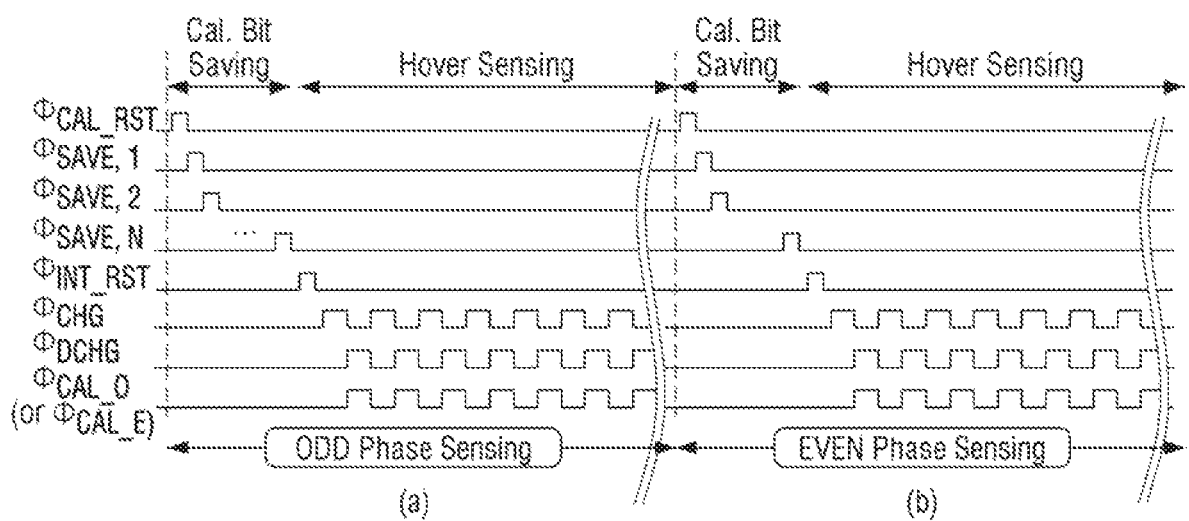
FIG. 4 is a timing chart for sensing hovering in the coordinate measurement device in which a driving signal of a high voltage is applied to the channel electrode unit according to an exemplary embodiment of the present disclosure.

Accordingly, the output signals outputted to the amplification unit 133 through the first and second generators 131, 132 in the first and second operation sections may be signals from which the movement noise occurring in each electrode and the error value related to the initial capacitance value of each electrode are removed, and the amplification unit 133 may amplify a difference between the output signals, and may output the amplified signal. Accordingly, the processor 140 may determine the position of the contact object by which hovering is sensed, based on the signal outputted through the amplification unit 133. FIG. 4 is a timing chart for sensing hovering in the coordinate measurement device in which a driving signal of a high voltage is applied to the channel electrode unit according to an exemplary embodiment of the present disclosure.

As shown in FIG. 4, the coordinate measurement device 100 may store the initial capacitance values of the plurality of electrodes prior to sensing hovering over an approaching contact object.

As described above, the capacitance values of the plurality of electrodes may cause an error due to a process deviation and an environmental deviation according to a fabrication process of a panel. Accordingly, in order to remove the error value caused by the initial capacitance value of each of the plurality of electrodes, the coordinate measurement device 100 may perform the following operations.

Specifically, the coordinate measurement device 100 may read out the initial capacitance value of each of the plurality of electrodes prior to applying a driving signal of a positive voltage or a negative voltage to the plurality of electrodes, and then may determine the read-out initial capacitance value as an error value related to each of the plurality of electrodes, and may store the error value in the calibration unit 134.

However, the present disclosure is not limited thereto. In response to a driving signal of a positive voltage or a negative voltage being applied to the plurality of electrodes, the coordinate measurement device 100 may read out a whole capacitance value related to the plurality of electrodes to which the driving signal of the positive voltage or the negative voltage is applied, and then may store an error value between the capacitance value read out from the respective electrodes and a reference capacitance value in the calibration unit 134.

In response to the error value related to the plurality of electrodes being stored in the calibration unit 134, the coordinate measurement device 100 may sense hovering over the contact object, based on the signal amplifying the difference between the output signals outputted in the first operation section, and the signal amplifying the difference between the output signals outputted in the second operation section.

Hereinafter, operations of adding reception signals received from the plurality of electrodes in each operation section in the coordinate measurement device 100, in which a driving signal of a high voltage is applied, and outputting the added signal, will be described in detail.

Figure 5:
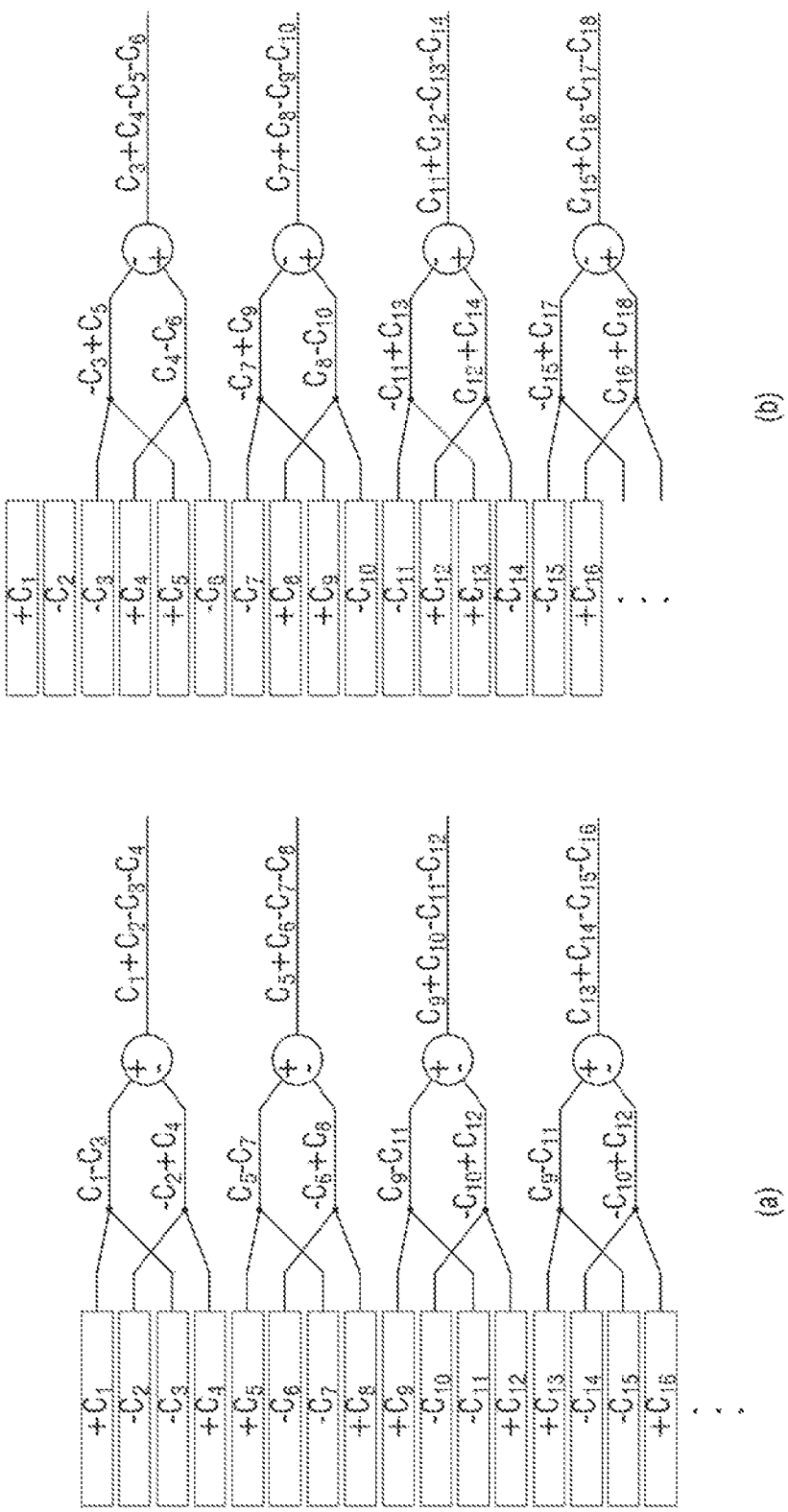
FIG. 5 is a first exemplary view for obtaining profile information regarding a plurality of electrodes, based on a reception signal of the channel electrode unit to which a driving signal of a high voltage is applied, in the coordinate measurement device according to an exemplary embodiment of the present disclosure.

FIG. 5 is a first exemplary view for obtaining profile information regarding the plurality of electrodes, based on a reception signal of the channel electrode unit to which a driving signal of a high voltage is applied, in the coordinate measurement device according to an exemplary embodiment of the present disclosure.

As shown in FIG. 5 ($a$), the first and second generators 131, 132 may output, to the amplification unit 133, output signals outputted from the reception signals received from the plurality of electrodes configured in the unit of four electrodes in the first operation section.

In addition, as shown in FIG. 5 ($b$), the first and second generators 131, 132 may output, to the amplification unit 133, output signals outputted from the reception signals received from the plurality of electrodes configured in the unit of four electrodes in the second operation section.

Specifically, as shown in FIG. 5 ($a$), in response to the reception signals of the first to fourth electrodes being received at the reception unit 130 in the first operation section, the first generator 131 may add the reception signals of the first and third electrodes ($C_1$–$C_3$), and may remove an amount of electric charge charged in the first and third electrodes. In addition, the second generator 132 may add the reception signals of the second and fourth electrodes ($C_2$–$C_4$), and may remove an amount of electric charge charged in the second and fourth electrodes. Accordingly, an output signal corresponding to a differential component remaining after the amount of electric charge charged in the first and third electrodes is removed, and an output signal corresponding to a differential component ($C_1$+$C_2$–$C_3$–$C_4$) remaining after the amount of electric charge charged in the second and fourth electrodes is removed may be outputted to the amplification unit 133.

Likewise, the first and second generators 131, 132 may output the output signals outputted from the reception signals received from the fifth to twelfth electrodes to the amplification unit 133, by performing the above-described series of operations.

On the other hand, as shown in FIG. 5 ($b$), in response to the reception signals of the third to sixth electrodes being received at the reception unit 130 in the second operation section, the first generator 131 may add the reception signals of the third and fifth electrodes ($C_3$–$C_5$), and may remove an amount of electric charge charged in the third and fifth electrodes. In addition, the second generator 132 may add the reception signals of the fourth and sixth electrodes ($C_4$–$C_6$), and may remove an amount of electric charge charged in the fourth and sixth electrodes. Accordingly, an output signal corresponding to a differential component ($C_1$+$C_2$–$C_3$–$C_4$) remaining after the amount of electric charge charged in the third and fifth electrodes is removed, and an output signal corresponding to a differential component ($C_3$+$C_4$–$C_5$–$C_6$) remaining after the amount of electric charge charged in the fourth and sixth electrodes is removed may be outputted to the amplification unit 133.

Likewise, the first and second generators 131, 132 may output the output signals outputted from the reception signals received from the other electrodes, which are grouped in the unit of four electrodes, to the amplification unit 133, by performing the above-described series of operations.

Prior to determining the position of the contact object by which hovering is sensed based on the signal outputted from the amplification unit 130, the processor 140 may compare the signal outputted through the amplification unit 130 and a predetermined threshold value, and may re-set a group for a plurality of electrodes to apply a positive voltage and a negative voltage.

For example, when the contact object is far away from the coordinate measurement device 100, a rate of the change of the capacitance in at least one electrode from among the plurality of electrodes may be very small, and accordingly, there may be a problem that the position of the contact object is not determined.

Accordingly, the processor 140 may compare the signal outputted through the amplification unit 130 and a predetermined threshold value, and, in response to the signal outputted through the amplification unit 130 being smaller than the threshold value, the processor 140 may re-set a group for the plurality of electrodes to apply a positive voltage and a negative voltage.

According to an exemplary embodiment, in response to the signal outputted through the amplification unit 130 being smaller than the threshold value, the processor 140 may control the driving unit 120 to apply a positive voltage and a negative voltage to the first to eighth electrodes which are grouped in the unit of eight electrodes, rather than the first to fourth electrodes which are grouped in the unit of four electrodes. Accordingly, the driving unit 120 may apply a positive voltage and a negative voltage to the first to eighth electrodes which are grouped in the unit of eight electrodes.

Figure 6:
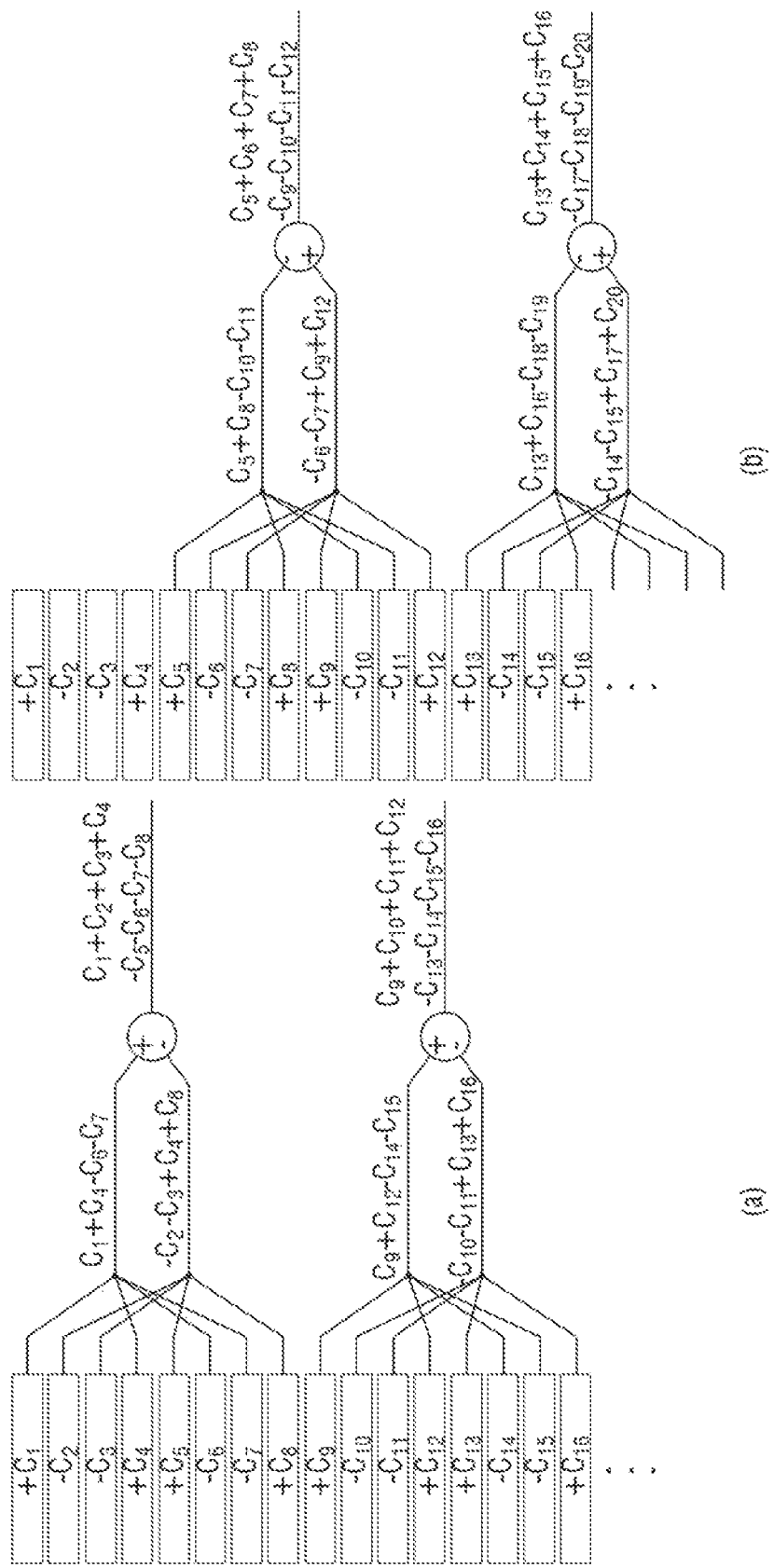
FIG. 6 is a second exemplary view for obtaining profile information regarding a plurality of electrodes based on a reception signal of a channel electrode unit to which a driving signal of a high voltage is applied in the coordinate measurement device according to an exemplary embodiment of the present disclosure.

FIG. 6 is a second exemplary view for obtaining profile information regarding the plurality of electrodes, based on a reception signal of the channel electrode unit to which a driving signal of a high voltage is applied, in the coordinate measurement device according to an exemplary embodiment of the present disclosure.

When the group is re-set in the unit of eight electrodes, rather than in the unit of four electrodes, the first and second generators 131, 132 may output, to the amplification unit 133, output signals outputted from the reception signals received from the plurality of electrodes configured in the unit of eight electrodes in the first operation section, as shown in FIG. 6(*a*).

In addition, as shown in FIG. 6(*b*), the first and second generators 131, 132 may output, to the amplification unit 133, output signals outputted from the reception signals received from the plurality of electrodes configured in the unit of eight electrodes in the second operation section.

Specifically, as shown in FIG. 6(*a*), in response to the reception signals of the first to eighth electrodes being received at the reception unit 130 in the first operation section, the first generator 131 may add the reception signals of the first, fourth, sixth, and seventh electrodes ($C_1+C_4-C_6-C_7$), and may remove an amount of electric charge charged in the first, fourth, sixth, and seventh electrodes. In addition, the second generator 132 may add the reception signals of the second, third, fifth, and eighth electrodes ($-C_2-C_3+C_5+C_8$), and may remove an amount of electric charge charged in the second, third, fifth, and eighth electrodes. Accordingly, an output signal corresponding to a differential component remaining after the amount of electric charge charged in the first, fourth, sixth, and seventh electrodes is removed, and an output signal corresponding to a differential component remaining after the amount of electric charge charged in the second, third, fifth, and eighth electrodes is removed may be outputted to the amplification unit 133.

Likewise, the first and second generators 131, 132 may output, to the amplification unit 133, the output signals outputted from the reception signals received from the other electrodes which are grouped in the unit of eight electrodes, by performing the above-described series of operations.

Figure 7:
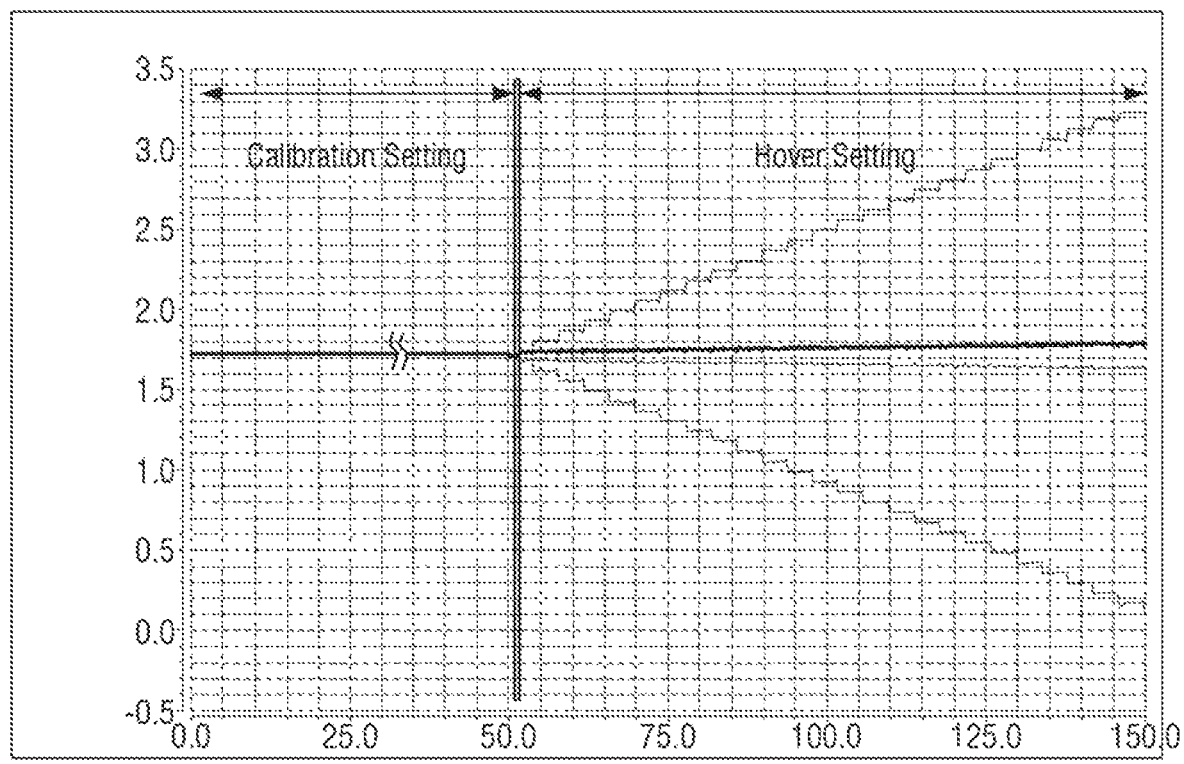
FIG. 7 is an exemplary view showing a signal in which hovering for each of the plurality of electrode is sensed based on a driving signal of a high voltage applied to the channel electrode unit in the coordinate measurement device according to an exemplary embodiment of the present disclosure.

FIG. 7 is an exemplary view showing a signal in which hovering for each of the plurality of electrodes is sensed based on a driving signal of a high voltage applied to the channel electrode unit in the coordinate measurement device according to an exemplary embodiment of the present disclosure.

As described above, the first and second generators 131, 132 may add the reception signals received from the plurality of electrodes in each of the first and second operation sections, and may output the added signals. Accordingly, the amplification unit 133 may amplify a difference between the output signals outputted from the first and second generators 131, 132 in each of the first and second operation sections.

Accordingly, as shown in FIG. 7, an output value of the signal amplified based on the reception signals of all of the electrodes in each of the first and second operation sections may be generated. Accordingly, the processor 140 may determine an electrode the capacitance value of which is changed by the contact object, from among the plurality of electrodes based on a finally generated output value from among the output values regarding the plurality of electrodes generated in each of the first and second operation sections, and may determine the position of the contact object based on the electrode the capacitance value of which is changed.

Figure 8:
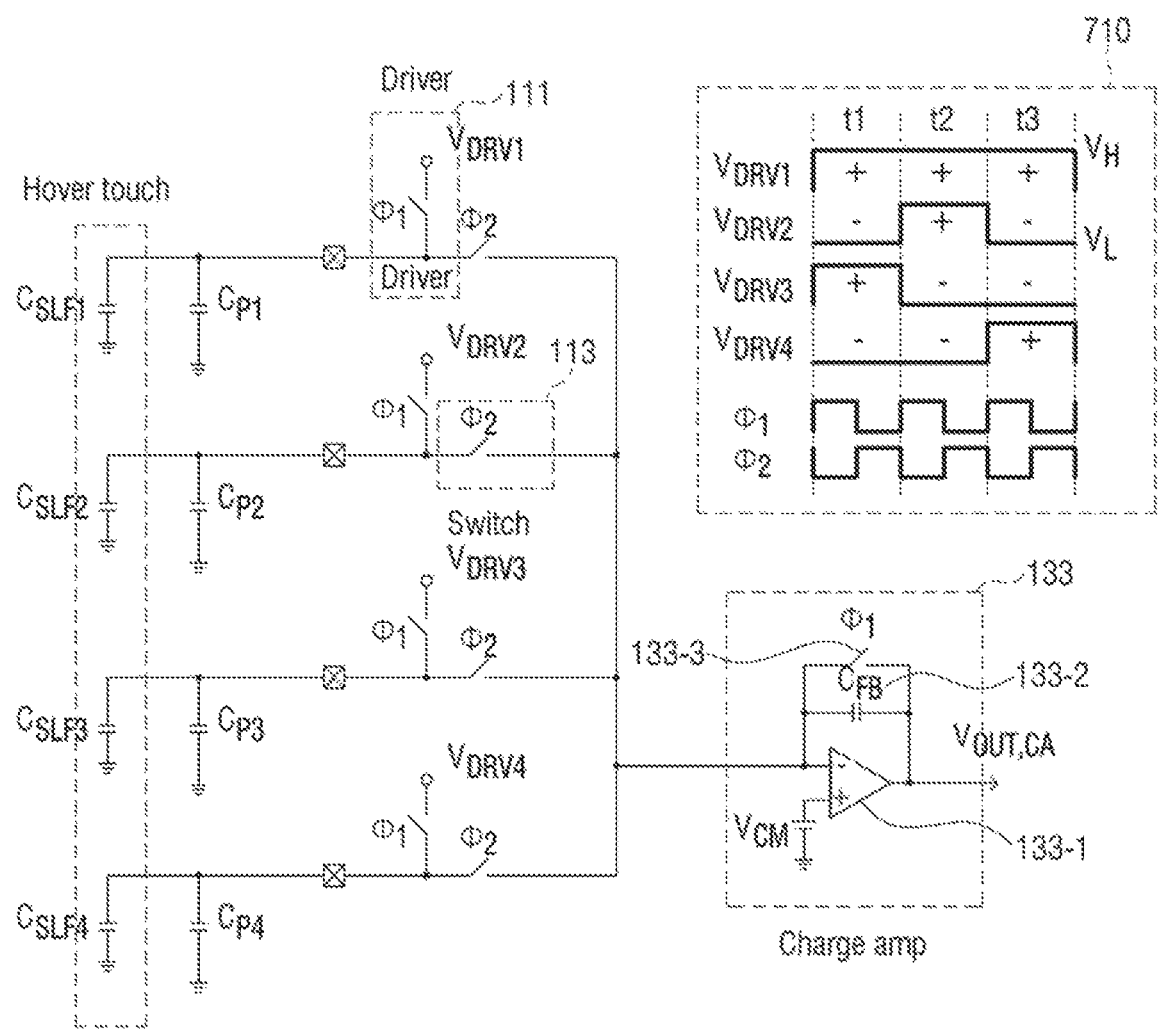
FIG. 8 is a first circuit diagram for sensing hovering by applying a driving signal to the channel electrode unit based on an orthogonal code in the coordinate measurement device according to another exemplary embodiment of the present disclosure.

FIG. 8 is a first circuit diagram for sensing hovering by applying a driving signal to the channel electrode unit based on an orthogonal code in the coordinate measurement device according to another exemplary embodiment of the present disclosure.

As shown in FIG. 8, the first switching unit 111 for each of the plurality of electrodes included in the channel electrode unit 110 may perform an on/off operation at a time when a driving signal of a positive voltage or a negative voltage is applied based on a pre-defined orthogonal code (Walsh code) 710.

Specifically, the first switching unit 111 corresponding to each of the first to fourth electrodes configured in the unit of four electrodes may perform the switching on/off operation based on a code value corresponding to the first to third operation sections t1-t3 of the orthogonal code 710.

That is, in the first operation section t1, the first switching unit 111 of the first and third electrodes may perform the switching on operation at a time when a driving signal of a positive voltage is applied, and the first switching unit 111 of the second and fourth electrodes may perform the switching on operation at a time when a driving signal of a negative voltage is applied. Accordingly, during the first operation section t1, the first and third electrodes may receive the driving signal of the positive voltage, and the second and fourth electrodes may receive the driving signal of the negative voltage.

In response to the second switching unit 113 of the first to fourth electrodes being switched on with the driving signals of the positive voltage and the negative voltage being applied to the first to fourth electrodes in the first operation section t1 as described above, the reception unit 130 may receive reception signals corresponding to the first to fourth electrodes, and the received reception signals may be all added and amplified through the amplification unit 133, and may be outputted.

On the other hand, in the second operation section t2, the first switching unit 111 of the first and second electrodes may perform the switching on operation at a time when a driving signal of a positive voltage is applied, and the first switching unit 111 of the third and fourth electrodes may perform the switching on operation at a time when a driving signal of a negative voltage is applied. Accordingly, during the second operation section t2, the first and second electrodes may receive the driving signal of the positive voltage, and the third and fourth electrodes may receive the driving signal of the negative voltage.

In response to the second switching unit 113 of the first to fourth electrodes being switched on with the driving signals of the positive voltage and the negative voltage being applied to the first to fourth electrodes in the second operation section t2 as described above, the reception unit 130 may receive reception signals corresponding to the first to fourth electrodes, and the received reception signals may be all added and amplified through the amplification unit 133, and may be outputted.

In the third operation section t3, the first switching unit 111 of the first and fourth electrodes may perform the switching on operation at a time when a driving signal of a positive voltage is applied, and the first switching unit 111 of the second and third electrodes may perform the switching on operation at a time when a driving signal of a negative voltage is applied. Accordingly, during the third operation section t3, the first and fourth electrodes may receive the driving signal of the positive voltage, and the second and third electrodes may receive the driving signal of the negative voltage.

In response to the second switching unit 113 of the first to fourth electrodes being switched on with the driving signals of the positive voltage and the negative voltage being applied to the first to fourth electrodes in the third operation section t3, the reception unit 130 may receive reception signals corresponding to the first to fourth electrodes, and the received reception signals may be all added and amplified through the amplification unit 133, and may be outputted.

Output voltages (Vout, CA) of the signals amplified from the reception signals corresponding to the first to fourth electrodes in the first to third operation sections t1-t3 may be represented as shown in table 1 presented below:

TABLE 1

| $C_{SLF1}$ | $C_{SLF2}$ | $C_{SLF3}$ | $C_{SLF4}$ | vout, CA |
|---|---|---|---|---|
| t0 | 1 | 1 | 1 | 1 | $\Delta V * (C_{SLF1} + C_{SLF2} + C_{SLF3} + C_{SLF4})$ |
| t1 | 1 | −1 | 1 | −1 | $\Delta V * (C_{SLF1} − C_{SLF2} + C_{SLF3} − C_{SLF4})$ |
| t2 | 1 | 1 | −1 | −1 | $\Delta V * (C_{SLF1} + C_{SLF2} − C_{SLF3} − C_{SLF4})$ |
| t3 | 1 | −1 | −1 | 1 | $\Delta V * (C_{SLF1} − C_{SLF2} − C_{SLF3} + C_{SLF4})$ |

Through table 1 presented above, the processor 140 may obtain capacitance values charged in the first to fourth electrodes corresponding to $C_{SLF1}$ to $C_{SLF4}$. Thereafter, the processor 140 may determine an electrode the capacitance value of which is changed by the contact object from among the first to fourth electrodes, based on the capacitance values of the first to fourth electrodes, and may determine the position of the contact object based on the electrode the capacitance of which is changed.

The reception signals of the first to fourth electrodes received at the reception unit 130 may include noise signals CP1-CP4 related to a display noise. Accordingly, the coordinate measurement device 100 according to the present disclosure may remove the noise signals from the reception signals received from the first to fourth electrodes, and may determine the position of the contact object based on the reception signals from which the noise signals are removed.

Specifically, output voltages (Vout, CA) of the noise signals CP-CP4 included in the reception signals of the first to fourth electrodes may be represented as in table 2 presented below:

TABLE 2

| | CP1 | CP2 | CP3 | CP4 | Vout, CA |
|---|---|---|---|---|---|
| t0 | 1 | 1 | 1 | 1 | $\Delta V * (CP1 + CP2 + CP3 + CP4)$ |
| t1 | 1 | −1 | 1 | −1 | $\Delta V * (CP1 − CP2 + CP3 − CP4)$ |
| t2 | 1 | 1 | −1 | −1 | $\Delta V * (CP1 + CP2 − CP3 − CP4)$ |
| t3 | 1 | −1 | −1 | 1 | $\Delta V * (CP1 − CP2 − CP3 + CP4)$ |

That is, in table 2, in the other operation sections t1-t3 except for the operation section corresponding to t0, the number of 1 and the number of −1 in the orthogonal code column are the same. Therefore, the noise signals CP1-CP4 included in the reception signals of the first to fourth electrodes may be offset by one another. That is, since the noise signals CP1-CP4 included in the reception signals of the first to fourth electrodes have similar sizes, the noise signals CP1-CP4 included in the reception signals of the first to fourth electrodes may be offset by one another.

In this case, the signal components $C_{SLF1}$ to $C_{SLF4}$ in the operation section corresponding to t0 may not be sensed. However, a profile on the signal components $C_{SLF1}$ to $C_{SLF4}$ corresponding to the first to fourth electrodes may be known without using the signal components $C_{SLF1}$ to $C_{SLF4}$ corresponding to the first to fourth electrodes in the operation section corresponding to t0. That is, the processor 140 may obtain capacitance values corresponding to the signal components $C_{SLF1}$ to $C_{SLF4}$ corresponding to the first to fourth electrodes through a relative relationship to the signal components $C_{SLF1}$ to $C_{SLF4}$ corresponding to the first to fourth electrodes, by using only Vout in the operation sections t1-t3 except for Vout in the operation section corresponding to t0.

In addition, the coordinate measurement device 100 may remove the noise signals included in the reception signals of the first to fourth electrodes through the circuit shown in FIG. 8, and may obtain capacitance values corresponding to the signal components $C_{SLF1}$ to $C_{SLF4}$ corresponding to the first to fourth electrodes, based on the reception signals from which the noise signals are removed.

Figure 9:
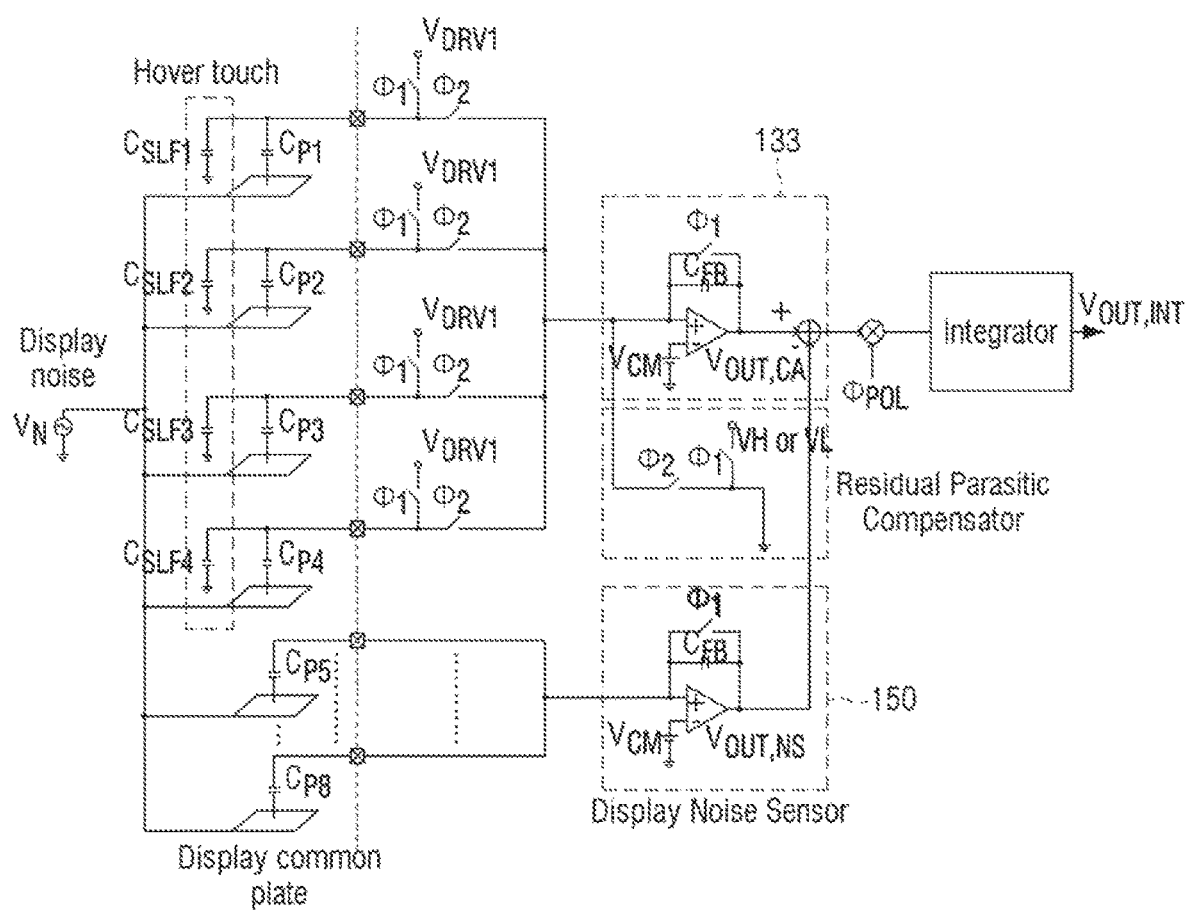
FIG. 9 is a second circuit diagram for sensing hovering by applying a driving signal to the channel electrode unit based on an orthogonal code in the coordinate measurement device according to still another exemplary embodiment of the present disclosure.

FIG. 9 is a second circuit diagram for sensing hovering by applying a driving signal to the channel electrode unit based on an orthogonal code in the coordinate measurement device according to still another exemplary embodiment of the present disclosure.

As described in FIG. 8, driving signals of a negative voltage and a positive voltage may be applied to the first to fourth electrodes configured in the unit of four electrodes, based on the orthogonal code which is defined according to each of the first to third operation sections.

Accordingly, the amplification unit 133 of the reception unit 130 may add the reception signals received from the first to fourth electrodes in each operation section, and may amplify the added signals and output the amplified signal.

As shown in FIG. 9, the noise reception unit 150 may amplify noise signals C5-C8 parasitic in electrodes to which the driving signals of the positive voltage and the negative voltage are not applied, and may output the amplified noise signals.

Accordingly, the reception unit 130 may subtract the output values of the signals amplified from the noise signals C5-C8 parasitic in the electrodes to which the driving signals of the positive voltage and the negative voltage are not applied, from the output values of the signals amplified from the reception signals received from the first to fourth electrodes in each operation section.

Accordingly, the noise signals C1-C4 included in the signals amplified from the reception signals received from the first to fourth electrodes in each operation section may be offset by the noise signals C5-C8 parasitic in the electrodes to which the driving signals of the positive voltage and the negative voltage are not applied. Accordingly, the processor 140 may determine the position of the contact object based on the signals in which the noise signals are offset.

Up to now, the operation of sensing the position of the contact object approaching the coordinate measurement device 100 in the coordinate measurement device 100 according to the present disclosure has been described in detail. Hereinafter, a hovering sensing method for sensing a position of a contact object approaching the coordinate measurement device 100 in the coordinate measurement device 100 according to the present disclosure will be described in detail.

FIG. 1 is a flowchart of a hovering sensing method in the coordinate measurement device according to an exemplary embodiment of the present disclosure.

Figure 10:
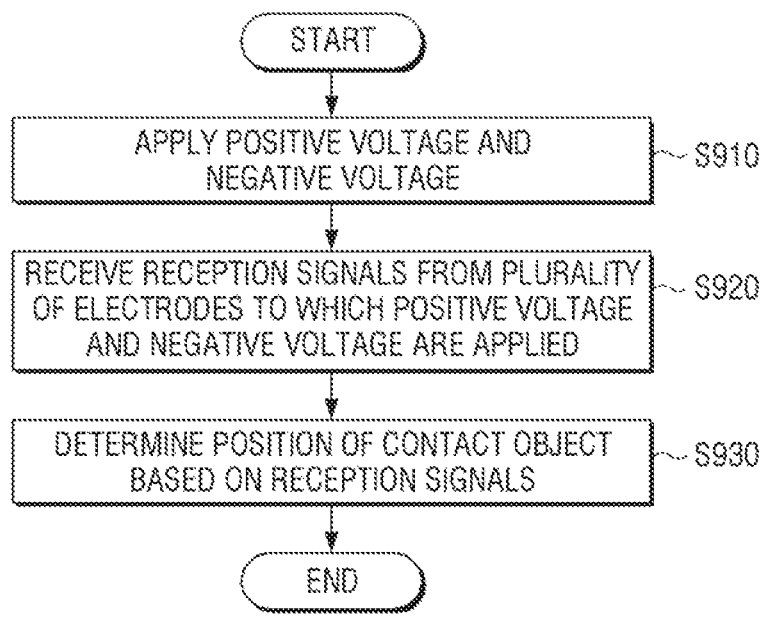
FIG. 10 is a flowchart of a hover sensing method in the coordinate measurement device according to an exemplary embodiment of the present disclosure.

As shown in FIG. 10, the coordinate measurement device 100 may apply a positive voltage and a negative voltage to the channel electrode unit including the plurality of electrodes (S910). Thereafter, the coordinate measurement device 100 may receive reception signals from the plurality of electrodes to which the positive voltage and the negative voltage are applied (S920). Thereafter, the coordinate measurement device 100 may determine a position of a contact object based on the received reception signals (930).

According to an exemplary embodiment, the coordinate measurement device 100 may apply a positive voltage to a first electrode group from among the plurality of electrodes, and may apply a negative voltage to a second electrode group from among the plurality of electrodes.

In applying the positive voltage and the negative voltage to the first and second electrode groups as described above, the coordinate measurement device 100 may apply the positive voltage to the first and fourth electrodes and may apply the negative voltage to the second and third electrodes in the unit of four electrodes. In this case, the positive voltage and the negative voltage applied to the first and second electrode groups may be high voltages.

In response to the positive voltage and the negative voltage being applied to the first and second electrode groups as described above, the coordinate measurement device 100 may amplify a difference between an output signal, which is outputted by adding reception signals received from the electrodes included in the first electrode group from among the electrodes included in the first and second electrode groups, and an output signal, which is outputted by adding reception signals received from the electrodes included in the second electrode group.

Accordingly, the coordinate measurement device 100 may sense the position of the contact object approaching the coordinate measurement device 100, based on the signal amplified based on the reception signals of the plurality of electrodes.

The reception signals of the plurality of electrodes may further include offset capacitance values of the plurality of electrodes included in the first and second electrode groups, and signal components related to capacitance values generated by hovering, and also, may further include signal components related to movement noises occurring in the plurality of electrodes included in the first and second electrode groups.

Accordingly, the coordinate measurement device 100 may perform the following operations in order to remove the movement noises occurring in the plurality of electrodes included in the first and second electrode groups.

According to an exemplary embodiment, in the ODD section, which is the first operation section, the coordinate measurement device 100 may receive and add reception signals of the first and third electrodes, and may receive and add reception signals of the second and fourth electrodes. In addition, in the Even section, which is the second operation section, the coordinate measurement device 100 may receive and add reception signals of the third and fifth electrodes, and may receive and add reception signals of the fourth and sixth electrodes.

Accordingly, signals generated from the reception signals received from the first and third electrodes in the first operation section may be $I_1$, $-I_1$, and signals generated from the reception signals received from the second and fourth electrodes may be $I_2$, $-I_2$. In this case, the movement noises included in $I_1$ and $I_2$ may be removed by adding $I_1$ and $-I_2$ and adding $-I_1$ and $I_2$.

Signals generated from the reception signals received from the third and fifth electrodes in the second operation section may be $I_1$, $-I_1$, and signals generated from the reception signals received from the fourth and sixth electrodes may be $I_2$, $-I_2$. In this case, the movement noises included in $I_1$ and $I_2$ may be removed by adding $I_1$ and $-I_2$ and adding $-I_1$ and $I_2$.

The capacitance values of the plurality of electrodes may cause an error due to a process deviation and an environmental deviation according to a fabrication process of a panel.

Accordingly, the coordinate measurement device 100 may store initial capacitance values stored for the plurality of electrodes before the positive voltage or negative voltage is applied to the plurality of electrodes. Thereafter, the coordinate measurement device 100 may apply a calibration signal corresponding to the initial capacitance value of the electrode to which the voltage is applied in the first or second operation section from among the plurality of electrodes.

Accordingly, the coordinate measurement device 100 may amplify the reception signals from which an error value related to the initial capacitance value of each electrode is removed, and may determine the position of the contact object by which hovering is sensed, based on the amplified signal.

In addition, prior to determining the position of the contact object by which hovering is sensed based on the amplified signal, the coordinate measurement device 100 may compare the amplified signal and a predetermined threshold value, and may re-set a group for a plurality of electrodes to apply a positive voltage and a negative voltage.

For example, when the contact object is far away from the coordinate measurement device 100, a rate of the change of the capacitance in at least one electrode from among the plurality of electrodes may be very small, and accordingly, there may be a problem that the position of the contact object is not determined.

Accordingly, the coordinate measurement device 100 may compare the amplified signal and a predetermined threshold value, and, in response to the amplified signal being smaller than the threshold value, the coordinate measurement device 100 may re-set a group for the plurality of electrodes to apply a positive voltage and a negative voltage.

According to an exemplary embodiment, in response to the amplified signal being smaller than the threshold value, the coordinate measurement device 100 may apply a positive voltage and a negative voltage to the first to eighth electrodes which are grouped in the unit of eight electrodes, rather than the first to fourth electrodes which are grouped in the unit of four electrodes. Thereafter, the coordinate measurement device 100 may determine the position of the contact object by performing the above-described series of operations based on reception signals received from the first to eighth electrodes grouped in the unit of eight electrodes.

According to another exemplary embodiment, the coordinate measurement device 100 may apply a positive voltage or a negative voltage corresponding to an orthogonal code to each of the plurality of electrodes, based on the orthogonal code which is defined in the unit of a plurality of operation sections and a plurality of electrodes.

According to an exemplary embodiment, the coordinate measurement device 100 may apply a positive voltage to the first and third electrodes, and may apply a negative voltage to the second and fourth electrodes in the first operation section in the unit of four electrodes. In addition, in the second operation section, the coordinate measurement device 100 may apply a positive voltage to the first and second electrodes, and may apply a negative voltage to the third and fourth electrodes. In addition, in the third operation section, the coordinate measurement device 100 may apply a positive voltage to the first and fourth electrodes, and may apply a negative voltage to the second and third electrodes.

Thereafter, the coordinate measurement device 100 may amplify the reception signals of the first to fourth electrodes to which the positive voltage and the negative voltage are applied in each operation section, and may determine the position of the contact object based on the amplified signal.

The reception signals of the first to fourth electrodes to which the positive voltage and the negative voltage are applied in each operation section may include noise signals parasitic in the first to fourth electrodes. Accordingly, the coordinate measurement device 100 may subtract an output value of a noise signal of at least one electrode to which a positive voltage and a negative voltage are not applied, from output values of the reception signals of the first to fourth electrodes to which the positive voltage and the negative voltage are applied. Accordingly, the coordinate measurement device 100 may output a signal obtained by removing noise signals from the reception signals of the first to fourth electrodes to which the positive voltage and the negative voltage are applied in each operation section, and may determine the position of the contact object approaching the coordinate measurement device 100, based on the signal from which the noise is removed.

Up to now, the present disclosure has been described with reference to preferred embodiments thereof.

While preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A coordinate measurement device comprising:
   a channel electrode circuit comprising a plurality of electrodes, wherein a capacitance of at least one electrode from among the plurality of electrodes is changed by an approach of a contact object;
   a driving circuit comprising:
     a first plurality of switches configured to select first pairs of electrodes of an electrode group from among the plurality of electrodes and second pairs of the electrodes of the electrode group;
     a second plurality of switches configured to selectively apply a positive voltage and a negative voltage to the electrodes of the electrode group; and
   a reception circuit comprising:
     a first generator configured to add signals received from the first pairs of selected electrodes among the electrodes of the electrode group and output a first signal; and
     a second generator configured to add signals received from the second pairs of selected electrodes among the electrodes of the electrode group and output a second signal; and
   a processor configured to determine a position of the contact object based on the first signal and the second signal,
   wherein the driving circuit is configured to control the first plurality of switches to select the first pairs of the electrodes and the second pairs of the electrodes, and control the second plurality of switches to apply;
     the positive voltage to first electrodes among the first pairs of the electrodes and the negative voltage to second electrodes among the first pairs of the electrodes, when the first pairs of electrodes are selected, and
     the positive voltage to first electrodes among the second pairs of the electrodes and the negative voltage to second electrodes among the second pairs of the electrodes, when the second pairs of electrodes are selected.

2. The coordinate measurement device of claim 1, wherein the electrode group comprises a circuit of four electrodes.

3. The coordinate measurement device of claim 2, wherein the reception circuit further comprises:
   an amplification circuit configured to amplify a difference between the first signal and the second signal, to output an amplified signal, and
   wherein the processor is configured to determine the position of the contact object based on the amplified signal.

4. The coordinate measurement device of claim 3, wherein the first pairs of the electrodes comprise a first electrode and a third electrode of the electrode group at a first timing, the second pairs of the electrodes comprise a second electrode and a fourth electrode of the electrode group at the first timing, and the first generator generates the first signal based on signals received from the first electrode, the second electrode, the third electrode, and the fourth electrode at the first timing, and
   wherein the first pairs of the electrodes comprise the third electrode and a fifth electrode of the electrode group at a second timing, the second pairs of the electrodes comprise the fourth electrode and a sixth electrode of the electrode group at the second timing, and the second generator generates the second signal based on signals received from the third electrode, the fourth electrode, the fifth electrode, and the sixth electrode at the second timing.

5. The coordinate measurement device of claim 4, wherein the first plurality of switches and second plurality of switches are lateral double diffused MOSs (LDMOSs).

6. The coordinate measurement device of claim 5, wherein the reception circuit further comprises:
- a calibration circuit configured to store an initial capacitance value of each of the plurality of electrodes, and to apply a calibration signal corresponding to an initial capacitance value of an electrode to which a voltage is applied, from among the plurality of electrodes; and
- a switching circuit configured to selectively provide the calibration signal of the calibration circuit to the amplification circuit, and
- wherein the amplification circuit generates the amplified signal based on the calibration signal.

7. The coordinate measurement device of claim 6, wherein the switching circuit is a CMOS.

8. A coordinate measurement device comprising:
- a channel electrode circuit comprising a plurality of electrodes, wherein a capacitance of at least one electrode from among the plurality of electrodes is changed by an approach of a contact object;
- a driving circuit configured to apply a negative voltage to a first portion of the plurality of electrodes, and to apply a positive voltage to a second portion of the plurality of electrodes;
- a reception circuit configured to receive reception signals from an electrode to which the positive voltage is applied and from an electrode to which the negative voltage is applied; and
- a processor configured to determine a position of the contact object based on the received signals,
- wherein the reception circuit is further configured to receive a noise signal from an electrode to which the positive voltage and the negative voltage are not applied, and
- wherein the processor is further configured to determine the position by subtracting the noise signal from the reception signals.

9. The coordinate measurement device of claim 8, wherein the driving circuit is configured to apply a positive voltage or a negative voltage corresponding to an orthogonal code to each of the plurality of electrodes, based on the orthogonal code which is defined in a circuit of a plurality of operation sections and a plurality of electrodes, and
   wherein the orthogonal code is defined such that a positive voltage is not applied to all of the plurality of electrodes.

10. The coordinate measurement device of claim 8, wherein the driving circuit is configured to apply a positive voltage to first and third electrodes, and to apply a negative voltage to second and fourth electrodes in a first operation section in a circuit of four electrodes, to apply a positive voltage to the first and second electrodes and to apply a negative voltage to the third and fourth electrodes in a second operation section, and to apply a positive voltage to the first and fourth electrode and to apply a negative voltage to the second and third electrodes in a third operation section.

11. The coordinate measurement device of claim 9, wherein the channel electrode circuit comprises:
- a first switching circuit configured to apply a positive voltage or a negative voltage corresponding to the orthogonal code to each of the plurality of electrodes; and
- a second switching circuit configured to operate alternately with the first switching circuit, and to selectively provide a reception signal from each of the plurality of electrodes.

12. The coordinate measurement device of claim 10, wherein the reception circuit further comprises an amplification circuit configured to receive and amplify reception signals from the first to fourth electrodes.

13. The coordinate measurement device of claim 12, wherein the amplification circuit comprises:
- an amplifier configured to receive the reception signals from the first to fourth electrodes through a negative terminal, and to receive a predetermined voltage through a positive terminal;
- a capacitor connected in parallel between the negative terminal and an output terminal; and
- a third switch configured to selectively connect both ends of the capacitor.

14. The coordinate measurement device of claim 13, wherein the third switch is switched on in a driving signal application section in which the positive voltage or the negative voltage is applied to the plurality of electrodes, and the third switch is switched off in a reception signal input section in which the reception signals are received.

* * * * *